United States Patent Office 2,855,396
Patented Oct. 7, 1958

2,855,396
MELAMINE PROCESS

John A. Sherred, New Orleans, La., assignor to Monsanto Chemical Company, St. Louis, Mo., a corporation of Delaware No Drawing. Continuation of Serial Nos. 608,423 and 608,424, September 7, 1956. This application January 14, 1958, Serial No. 708,765

11 Claims. (Cl. 260—249.7)

The present invention relates to the preparation of melamine and more particularly to the preparation of melamine from ammonia and hydrogen cyanide.

It is known that melamine is formed if hydrogen cyanide and ammonia are heated in a high pressure system, i. e., at pressures of at least 500 p. s. i. and upwards (see U. S. Patent 2,577,201). The advantages of conducting this reaction without recourse to the expensive special equipment which must necessarily be employed in high-pressure syntheses and minus the ever-present hazards connected with high-pressure operations are immediately obvious. I have now found that it is possible to produce melamine from hydrogen cyanide and ammonia at atmospheric pressure. According to my invention, melamine may be produced by heating hydrogen cyanide and ammonia together in the presence of a dehydrogenation catalyst chosen from the group consisting of the oxides of chromium and the metals of group VIII of the periodic system.

The following examples illustrate the invention but are not to be construed as limiting it in any manner except as it is limited in the appended claims.

Example I

A quartz tube about 30 in. long and approximately 0.7 in. in diameter was employed as a reactor. A bed of a commercial dehydrogenation catalyst consisting of activated alumina impregnated with 18–20% chromic oxide about 7 in. in depth was supported within the reactor on a circular porous quartz plate located at about the midpoint of the tube. The catalyst bed was heated by means of a 9-in. electric tube furnace and temperatures in the bed were recorded by means of a sliding iron-constantan thermocouple inserted in a quartz thermowell which extended throughout the catalyst bed.

Gaseous HCN was fed into a line to the reactor provided with a flowmeter from a vaporizer which consisted of a breathing oxygen cylinder immersed in a water bath maintained at 50° C. The entire line was wrapped with a Nichrome wire which was insulated with a glass fiber jacket. The flowmeter was jacketed with a glass cylinder likewise wrapped with insulated Nichrome wire. An electric current through the wire kept the HCN line and flowmeter at a temperature of approximately 50° C. Ammonia gas was fed from a conventional gas cylinder through a feed line provided with a flowmeter and part of the line was coiled and submerged in the water bath maintained at 50° C. This line was joined to the HCN feed line by a T connection just above the reactor. No special precautions were taken to keep the ammonia line heated.

The catalyst bed was heated to a temperature of 425° C. and HCN and $NH_3$ vapors in a mole ratio of 1:2 were passed through it at a rate equivalent to about 400 cm.³ per min at standard conditions for a period of about 2.75 hr. Maximum temperature recorded during the run in the middle of the catalyst bed was 600° C. Contact time or residence time in the catalyst bed was of the order of one second. Pressure throughout the run never exceeded 0.2 in. of mercury above atmospheric (30.11 in.).

Reaction products were collected from the lower and cooler part of the reactor tube immediately below the catalyst bed and in two connected flasks attached to the bottom of the reactor functioning as traps, one of which was air-cooled and the other of which was immersed in an ice-water bath. The white needle-like crystals of melamine obtained were extracted with hot water and then precipitated from the solution with picric acid. The melting point of the picrate derivative was 320° C., the same as that obtained on a known sample of melamine picrate and the infrared spectra for the recovered product and the known sample were identical.

Example II

The experiment of Example I was repeated over a reaction period of about 6 hours employing a mole ratio of hydrogen cyanide to ammonia of 1:4, a temperature of 450° C. a catalyst contact time of 1.0 second, and a catalyst comprising palladium supoprted on activated alumina in pelletized form (Houdry Chemical Corp. Code No. 314 J X1–2X1). The crude melamine product recovered had a melting point within 5° C. of that obtained for a refined commercial sample of melamine determined simultaneously. The melamine product was further identified by means of the melting points as well as the infrared spectra of both its picrate and oxalate derivatives.

Example III

Several more experiments were conducted using the apparatus and essentially the same general procedure and reaction conditions of temperature, ratio of reactants, residence time, etc. described in Example I but employing different catalysts. In the several runs made, platinum, nickel, and cobalt each supported on alumina were used in the catalyst bed being 5 to 5¼ in. in depth and the reaction time three, seven, and 4.6 hours, respectively. These catalysts were prepared as follows:

Platinum.—Alumina pellets impregnated with chloroplatinic acid were subjected to reduction treatment at 825° C. in air for 2 hours.

Nickel.—A solution of nickelous chloride was prepared by dissolving 10.1 g. of $NiCl_2 \cdot 6H_2O$ in 112 ml. of water. To this was added 50 g. of 6–10 mesh crushed alumina pellets and the mixture was stirred for ½ hr. At the end of this time 66 ml. of 1.84 N ammonium carbonate solution was added and the stirring was continued for an additional half-hour. The excess liquid was removed by filtration, the precipitate was washed with water and dried at 110° C. The nickel carbonate on alumina was reduced in a stream of hydrogen (2–5 l. per hour) at 500–550° C. for 7 hours.

Cobalt.—Prepared in the same manner as the nickel catalyst above using cobalt nitrate $(Co(NO_3)_2 \cdot 6H_2O)$ as the starting salt.

Melamine was produced in each run and the crude product was identified by means of the melting point and infrared spectra of its picrate derivative.

While the examples represent specific embodiments and describe particular catalysts, temperatures, reactant ratios, and the like, it is to be understood that substantial variation may be made in conditions without departing from the scope of the invention. For example, although the preferred catalysts are the oxides of bi- or trivalent chromium or any of the metals of group VIII deposited or supported on alumina, the chromium oxides or group VIII metals may be used per se or other carriers may be employed. Any of the commonly used catalyst supports are suitable. In addition to alumina suitable materials include charcoal, silica gel, fuller's earth, kaolin, and the like which are easily impregnated by techniques similar to those described for the catalysts tested. Likewise, any mixture or combination of any of the metals of group VIII can be used as catalysts. Also chromium oxide catalysts in which there are incorporated small amounts of stabilizing agents such as the difficulty-reducible oxides of zirconium, titanium, silicon, and the like, or of light reducible oxides of tellurium, beryllium, and the like as well as highly active chromoxide gels can be employed.

Any temperatures within the range from 400–750° C. may be used, depending upon the catalyst chosen. Preferably, the temperature of the catalyst bed is kept between 450 to 600° C. The reaction is exothermic to some extent and external heat input is, therefore, minimized after the reaction is initiated.

The hydrogen cyanide and ammonia can be present in almost any mole ratio from 1:20 to 20:1 respectively, or even wider. Yields are somewhat impractical though when the mole ratio is below 1:1 and mole ratios of HCN to ammonia in the range from 1:2 to 1:10 are preferred.

This application is a continuation of my copending applications Serial No. 608,423 and Serial No. 608,424, both now abandoned, both filed September 7, 1956, which applications were continuations-in-part of my application Serial No. 542,101, filed October 21, 1955, and now abandoned.

What is claimed is:

1. The process for producing melamine which comprises heating ammonia and hydrocyanic acid in the vapor phase at a temperature within the range from about 450° to about 750° C. at atmospheric pressure in the presence of a dehydrogenation catalyst chosen from the group consisting of the oxides of chromium and the metals of group VIII of the periodic system.

2. The process for producing melamine which comprises heating ammonia and hydrocyanic acid in the vapor phase at a temperature within the range from about 400° to about 750° C. at atmospheric pressure in the presence of a dehydrogenation catalyst comprising oxides of chromium.

3. The process for producing melamine which comprises heating ammonia and hydrocyanic acid in the vapor phase at a temperature from about 450° to about 600° C. at atmospheric pressure in the presence of a supported chromium oxide catalyst.

4. The process for producing melamine which comprises passing hydrogen cyanide and ammonia in the vapor phase in a mole ratio of 1:4 to 1:10 over a bed of a catalyst comprising activated alumina impregnated with chromic oxide maintained at a temperature of 450–600° C. at atmospheric pressure and recovering the thus formed melamine.

5. The process for producing melamine which comprises heating amonia and hydrocyanic acid in the vapor phase at a temperature within the range from about 450° to about 750° C. at atmospheric pressure in the presence of a dehydrogenation catalyst comprising a metal from group VIII of the periodic system.

6. The process for producing melamine which comprises heating ammonia and hydrocyanic acid in the vapor phase at a temperature within the range from about 450° to about 750° C. at atmospheric pressure in the presence of a dehydrogenation catalyst comprising a metal from group VIII of the periodic system supported on a carrier.

7. The process for producing melamine which comrises heating ammonia and hydrocyanic acid in the vapor phase at a temperature within the range from about 450° to about 750° C. at atmospheric pressure in the presence of a dehydrogenation catalyst comprising a metal from group VIII of the periodic system supported on alumina and recovering the thus formed melamine.

8. The process of claim 7 wherein said metal is palladium.

9. The process of claim 7 wherein said metal is platinum.

10. The process of claim 7 wherein said metal is nickel.

11. The process of claim 7 wherein said catalyst is cobalt.

References Cited in the file of this patent

UNITED STATES PATENTS

| | | |
|---|---|---|
| 2,577,201 | Lane | Dec. 4, 1951 |
| 2,615,018 | Lane | Oct. 21, 1952 |
| 2,615,019 | Klapproth | Oct. 21, 1952 |